US008197154B2

(12) United States Patent
Broering et al.

(10) Patent No.: US 8,197,154 B2

(45) Date of Patent: Jun. 12, 2012

(54) ARTICULATING JOINT FOR DENTAL OR MEDICAL LIGHTS

(75) Inventors: Jacob E. Broering, Yorkshire, OH (US); Leo R. Hanus, Tipp City, OH (US)

(73) Assignee: Midmark Corporation, Versailles, OH (US)

( * ) Notice: Subject to any disclaimer, the term of this patent is extended or adjusted under 35 U.S.C. 154(b) by 421 days.

(21) Appl. No.: 12/262,932

(22) Filed: Oct. 31, 2008

(65) Prior Publication Data

US 2010/0110689 A1 May 6, 2010

(51) Int. Cl.
*F16D 1/12* (2006.01)

(52) U.S. Cl. .................................... 403/165; 248/274.1

(58) Field of Classification Search ............... 248/274.1, 248/278.1; 362/418-419, 427-429; 403/119, 403/145, 146, 164, 165, 305

See application file for complete search history.

(56) References Cited

U.S. PATENT DOCUMENTS 3,044,798 A * 7/1962 Gerner ..................... 280/93.509
3,104,067 A * 9/1963 Stiffel ........................... 362/421
3,240,925 A * 3/1966 Paschke et al. ................. 362/33
3,369,848 A * 2/1968 Gerner .......................... 384/218
3,655,226 A * 4/1972 Cowan .......................... 403/165
4,139,883 A 2/1979 Ilzig et al.
4,402,236 A * 9/1983 Nishikawa ...................... 74/493
4,487,389 A * 12/1984 Ziegler ....................... 248/282.1
4,516,751 A * 5/1985 Westbrook ................. 248/279.1
4,517,632 A * 5/1985 Roos ............................ 362/389
4,620,351 A * 11/1986 Teramachi ................. 29/898.03
4,673,154 A * 6/1987 Karapita ....................... 248/320
4,722,502 A * 2/1988 Mueller et al. ............. 248/284.1
4,836,486 A * 6/1989 Vossoughi et al. ....... 248/281.11
4,976,129 A * 12/1990 Setzer et al. .................... 72/247
5,037,053 A * 8/1991 Fox et al. ................. 248/280.11
5,127,617 A * 7/1992 Bergetz ...................... 248/278.1
5,484,220 A * 1/1996 Lewis et al. ................... 403/165
5,487,524 A * 1/1996 Bergetz ......................... 248/613
5,743,503 A * 4/1998 Voeller et al. ............. 248/284.1
5,772,350 A * 6/1998 Ferguson et al. ............... 403/78
6,012,693 A * 1/2000 Voeller et al. ............ 248/280.11
6,012,821 A * 1/2000 Yeaney et al. .................. 362/33
6,030,103 A * 2/2000 Gampe et al. ................. 362/404
6,280,056 B1 * 8/2001 Dolan et al. ............... 362/249.1
6,328,458 B1 * 12/2001 Bell et al. ...................... 362/371
6,364,268 B1 * 4/2002 Metelski ....................... 248/317
6,367,756 B1 * 4/2002 Wang ......................... 248/278.1

(Continued)

OTHER PUBLICATIONS

US Patent and Trademark Office; Search Report and Written Opinion in International Patent Application No. PCT/US2009/049891 dated Aug. 27, 2009.

*Primary Examiner* — Daniel P. Stodola
*Assistant Examiner* — Daniel Wiley
(74) *Attorney, Agent, or Firm* — Wood, Herron & Evans, LLP

(57) ABSTRACT

An articulating joint for supporting a medical or dental light having a first mounting post rotatably couples the light to a support structure having a second mounting post. The articulating joint includes a joint body having first and second terminal ends. A first bearing and a first brake are located proximate the first end for receiving and frictionally engaging the first mounting post. The joint body may further include a second bearing and a second brake proximate the second end for receiving and frictionally engaging the second mounting post. The articulating joint further includes a cover that is removably coupled to the joint body over at least the first bearing and the first brake.

11 Claims, 3 Drawing Sheets

U.S. PATENT DOCUMENTS 6,471,363 B1 * 10/2002 Howell et al. .................. 362/11
6,632,170 B1 * 10/2003 Bohanan et al. ............. 600/102
6,663,064 B1 * 12/2003 Minelli et al. ............ 248/205.5
6,695,270 B1 * 2/2004 Smed ........................ 248/274.1
6,736,364 B2 * 5/2004 Oddsen, Jr. .................. 248/585
6,817,585 B2 * 11/2004 Wagner et al. ............... 248/324
6,997,425 B2 * 2/2006 Metelski ...................... 248/676
7,097,145 B2 * 8/2006 Turner .................... 248/281.11
7,156,541 B2 * 1/2007 Yeung .......................... 362/418
7,219,864 B2 * 5/2007 Strauss et al. ............. 248/122.1
7,241,263 B2 * 7/2007 Boulais ........................ 600/137
7,338,022 B2 * 3/2008 Hung et al. ............... 248/278.1
7,380,760 B2 * 6/2008 Dittmer ...................... 248/278.1
7,389,965 B2 * 6/2008 Oddsen et al. ............ 248/274.1
7,472,458 B2 * 1/2009 Oddsen, Jr. ..................... 16/255
7,646,161 B2 * 1/2010 Albu-Schaffer et al. ... 318/568.2
7,665,875 B2 * 2/2010 Whitman ...................... 362/572
2003/0021107 A1 * 1/2003 Howell et al. ................. 362/147
2004/0251389 A1 * 12/2004 Oddsen, Jr. ................ 248/279.1
2010/0084527 A1 * 4/2010 Lau et al. .................. 248/217.4
2010/0097815 A1 * 4/2010 Song et al. .................... 362/418

* cited by examiner

ARTICULATING JOINT FOR DENTAL OR MEDICAL LIGHTS

TECHNICAL FIELD

This invention generally relates to support structure for dental or medical lights, and more specifically to an articulating joint for supporting dental or medical lights.

BACKGROUND

Conventional dental operatories generally include an articulating dental chair for supporting a patient in a variety of positions to facilitate the performance of dental procedures and operations. For example, dental chairs are generally adapted to be raised and lowered relative to a floor surface, and to be moved between a first orientation where a seat back is inclined relative to a seat base to support the patient in a seated position, and a second orientation where the seat back is reclined to support the patient in a generally supine position.

The dental operatory may also include a dental delivery unit adapted to support various instruments and tools used during the performance of dental procedures. The delivery unit is typically provided with water and pressurized air for operating the instruments, and may include a tray for supporting instruments or other articles used by the practitioner. The delivery unit may be supported on a movable arm that facilitates positioning the unit and instruments adjacent the dental chair for convenient access by the practitioner during the performance of a procedure, then moved away to permit the patient to exit the dental chair when the procedure is complete.

Conventional dental operatories may further include a cuspidor provided adjacent the dental chair to permit patients to expel the contents of their mouths during or at the conclusion of the dental procedure, an adjustably positionable light to illuminate the treatment area, and various other devices useful for the performance of dental procedures. Such devices may be supported on cabinetry or other structure positioned adjacent the dental chair for convenient access by the patient or the dental practitioner.

Conventional adjustable position lights are typically coupled via an elbow joint to a support structure that extends over a patient. The elbow joint allows the light to rotate around the longitudinal axis of a post extending from the light assembly. The elbow joint must be strong enough to support the weight of the light, and maneuverable to facilitate illumination of various locations on the patient's body. Further, the elbow joint needs to allow for easy manipulation of the light while also limiting rotational movement so that the light is held in a desired position. To accomplish these functions, conventional joints supporting lights have been fitted with an elongated bearing in the shape of a sleeve having a slit along its longitudinal axis. The elongated bearing is positioned between the inner surfaces of the elbow joint and the post extending from the light into the elbow joint. Pressure applied to the sleeve by an outer covering of the joint increases the frictional force applied to the post and restricts the rotation of the post in the joint. A known drawback with elbow joints having this construction is that the sleeve, typically made of brass, functioning as both a bearing and a brake, tends to wear out relatively quickly as the metal fatigues and the slit in the sleeve begins to spread. A further drawback is that the frictional force applied to the post is difficult to adjust, thereby making the maintenance of the elbow joint, and correspondingly the light, difficult and time consuming.

There is a need for articulating joints for supporting dental or medical lights that overcomes these and other drawbacks of prior joints.

SUMMARY

The present invention overcomes the foregoing and other shortcomings and drawbacks of joints heretofore known for supporting dental or medical lights. While the invention will be described in connection with certain embodiments, it will be understood that the invention is not limited to these embodiments. On the contrary, the invention includes all alternatives, modifications and equivalents as may be included within the spirit and scope of the present invention.

In one aspect, articulating joint for coupling a medical light having a first mounting post to a support structure having a second mounting post includes a joint body having first and second terminal ends. A first bearing having an inner surface is provided near the first end and is adapted to receive the first mounting post. A first brake is coupled to the joint body near the first bearing and is adjustably biased to frictionally engage the first mounting post when the first mounting post is received in the first bearing. The articulating joint further includes a cover removably coupled to the joint body over at least the first bearing and the first brake.

In another aspect, the articulating joint may further include a second bearing and a second brake near the second end of the joint body. The second bearing has an inner surface and is adapted to receive the second mounting post along the inner surface. The articulating joint may further include a third bearing near the first end and spaced from the first bearing, and/or a fourth bearing near the second end and spaced from the second bearing. In yet another aspect, the first brake may be disposed between the first and third bearings, and the second brake may be disposed between the second and fourth bearings.

In another aspect, an illumination apparatus includes a medical light having a first mounting post and an articulating joint coupling the medical light to a support structure. The articulating joint comprises a joint body having first and second terminal ends. A first bearing having an inner surface is disposed proximate the first terminal end. The first mounting post is received in the bearing along its inner surface. A first brake is coupled to the joint body proximate the first bearing and is adjustably biased to frictionally engage the first post. A cover is removably coupled to the joint body over at least the first bearing and the first brake. The second terminal end of the joint body may be configured for coupling to a mounting post extending from a support structure.

These and other features, objects and advantages of the invention will become more readily apparent to those skilled in the art in view of the following detailed description, taken in conjunction with the accompanying drawings.

DETAILED DESCRIPTION

When introducing elements of the present invention (e.g., the exemplary embodiments(s) thereof), the articles "a", "an", "the" and "said" are intended to mean that there are one or more of the elements. The terms "comprising", "including" and "having" are intended to be inclusive and mean that there may be additional elements other than the listed elements.

Figure 1:
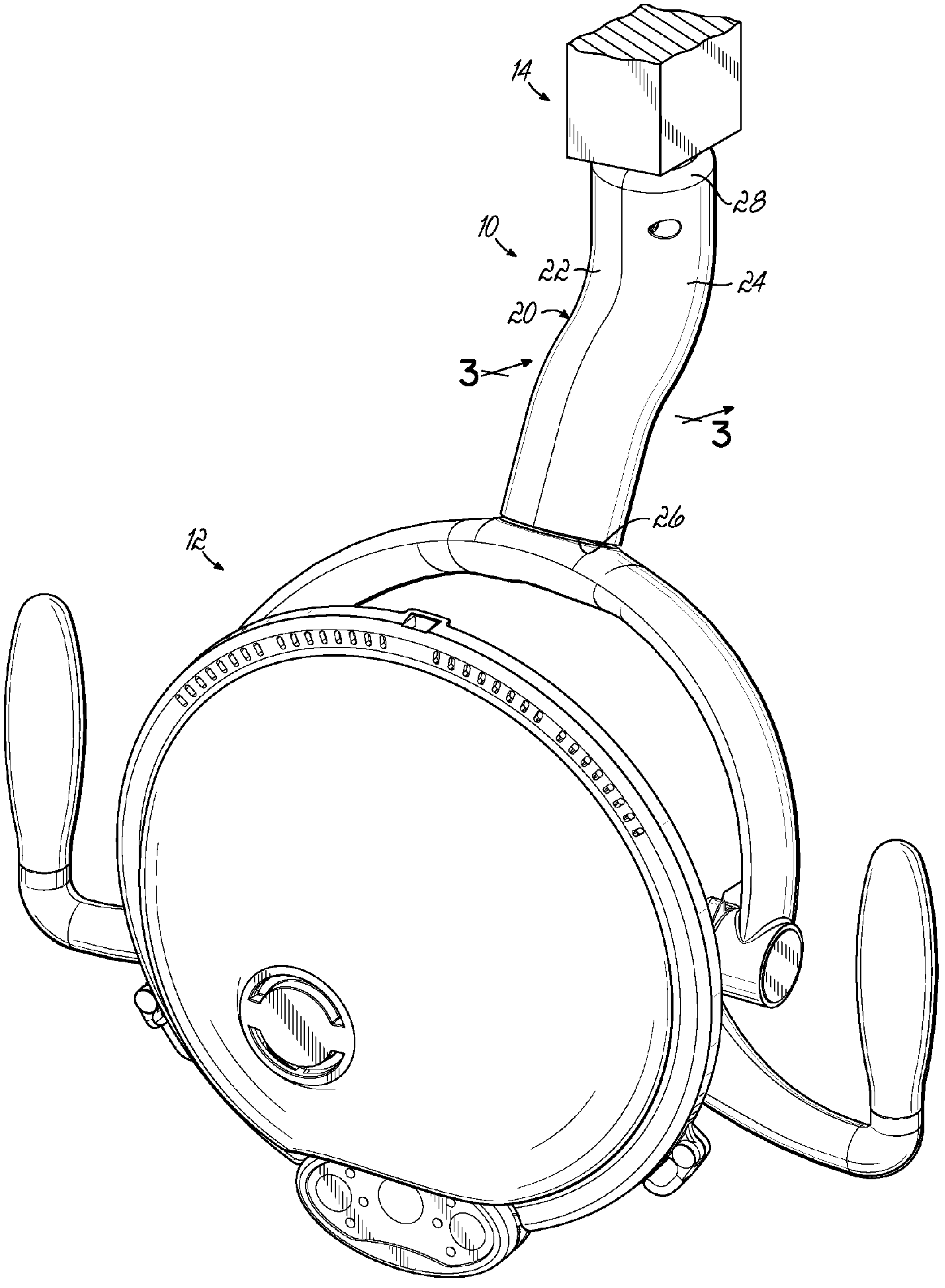
FIG. 1 is a perspective view of an exemplary articulating joint and medical light in accordance with the present disclosure.
Figure 2:
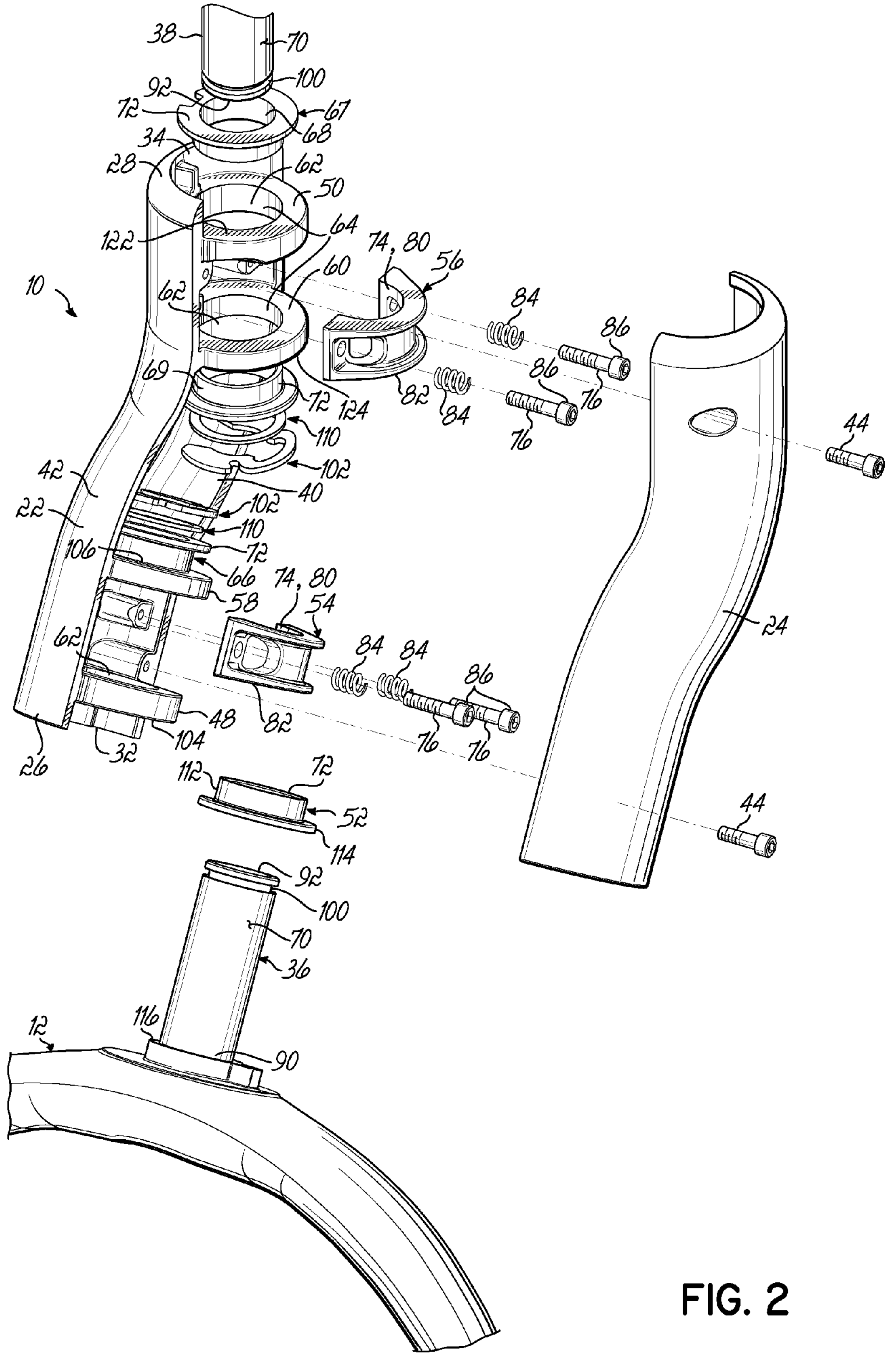
FIG. 2 is an exploded perspective view of the articulating joint of FIG. 1.
Figure 3:
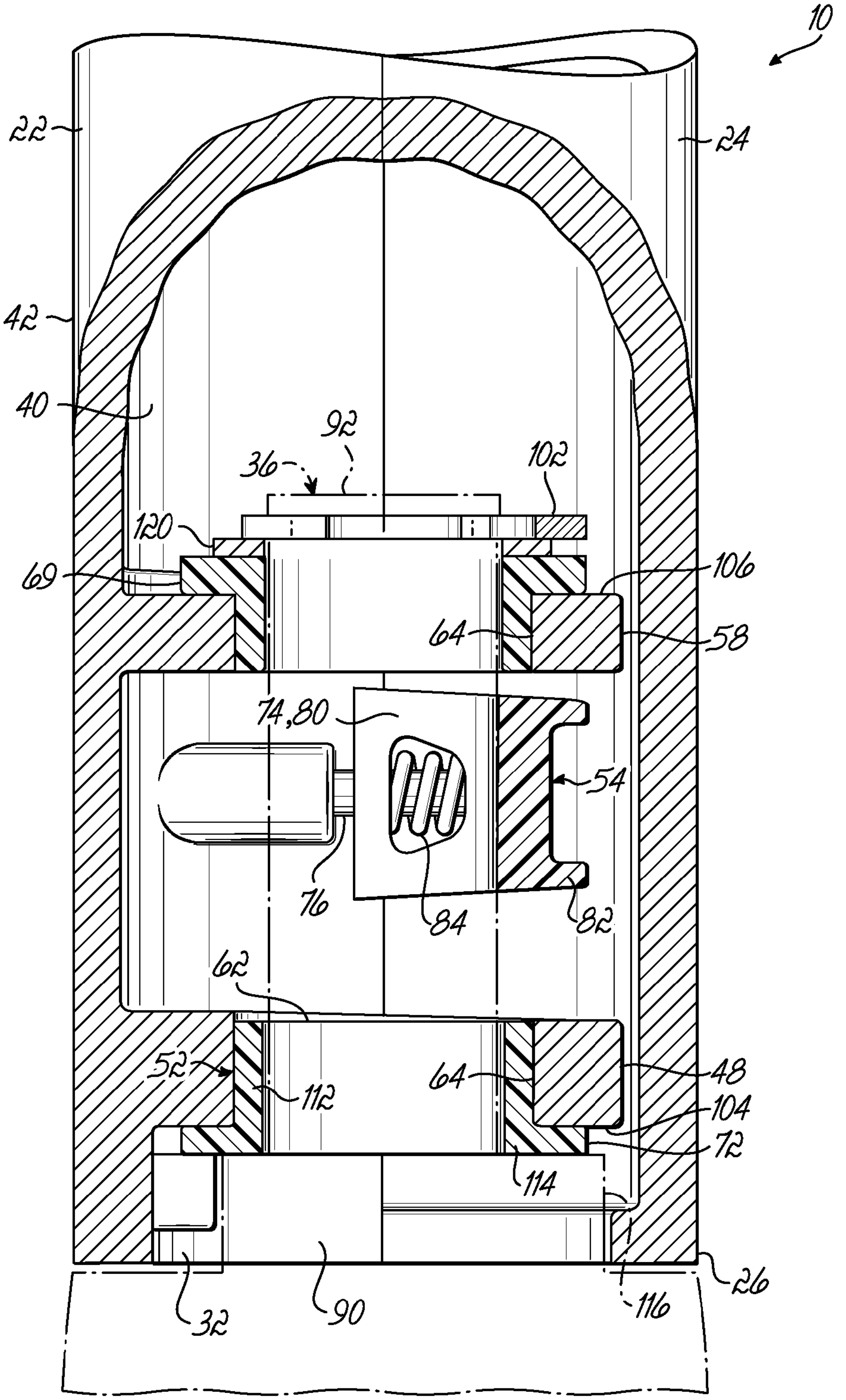
FIG. 3 is a schematic cross-sectional view of the articulating joint taken along line 3-3 of FIG. 1.

FIGS. 1-3, depict an exemplary articulating joint 10 for use with a medical or dental light 12. The articulating joint 10 couples the medical or dental light 12 to a support structure 14, such as a support arm or track system (not shown). The articulating joint 10 allows the light 12 to rotate or pivot around the longitudinal axis of the articulating joint. The unique construction of the articulating joint 10 allows the medical or dental light 12 to rotate easily about the longitudinal axis of the joint 10, while also providing enough resistance to rotation to hold the light 12 stationary in a desired position once an applied force for moving the light is removed. The construction of the articulating joint 10 also allows for easy adjustment of the resistance to rotation and provides greater durability than articulating joints currently available.

As seen in FIGS. 1-3, the articulating joint 10 consists of a cover 24 and a joint body 22 having first and second terminal ends 26, 28. The first terminal end 26 has a first opening 32 and is configured for coupling to one of a medical light 12 or a support structure 14. The second terminal 28 end has a second opening 34 and is configured for coupling to the other of the medical light 12 or support structure 14. Specifically, at least one of the first or second terminal ends 26, 28 is configured for coupling to a mounting post 36, 38 coupled to and extending from the medical light 12 or support structure 14. Likewise, the other of the first or second terminal ends 26, 28 of articulating joint 10 is configured for coupling to the other of medical light 12 or support structure 14. The other of the first or second terminal ends 26, 28 may be configured for coupling to a mounting post 36, 38 coupled to and extending from the other of the medical light 12 or support structure 14, or may be coupled in some other manner, such as by a ball and socket joint, by a bracket, or various other coupling structure.

Joint body 22 is substantially hollow and is capable of withstanding the stresses associated with supporting and moving medical light 12. Joint body 22 has an inner portion 40 and an outer portion 42. The first and second openings 32, 34 found at the first and second terminal ends 26, 28 of joint body 22 allow fluid communication between the inner portion 40 and outer portion 42 of joint body 22.

In the embodiment shown, joint body 22 and cover 24 have a double arcuate shape along the length of the joint 10, as seen in FIGS. 1 and 2. In other embodiments, joint body 22 and cover 24 may have an arcuate or substantially linear shape. The double arcuate shape provides an advantage of increasing the range of motion for light 12. However, it is understood that the articulating joint may have any shape that is consistent with the use of positioning medical light 12.

Joint body 22 is constructed such that it is capable of withstanding the stresses associated with supporting and moving the medical light 12. Joint body 22 may comprise a thickened half sleeve, as seen in FIGS. 2 and 3, or frame, or other suitable structure. Joint body 22 may be made of any suitable material or combination of materials capable of withstanding the stresses associated with supporting the medical light 12, such as, without limitation, steel, aluminum, titanium, metal alloys, hardened plastics, composite materials, and combinations thereof. Joint body 22 may be manufactured using various techniques, such as without limitation forging, molding, shaping, and cutting.

Cover 24 primarily functions to shield the internal components of joint body 22, but may also provide structural support to articulating joint 10. Cover 24 may be made of any suitable material. In the embodiment shown, the cover 24 is coupled to the joint body 22 by screws 44. It will be appreciated, however, that cover 24 may be removably coupled to joint body 22 by any suitable method or structure, such as by bolts, clamps, latches, locks, lugs, nuts, pins, rivets, or screws, for example.

As mentioned above, at least one of the first or second terminal ends 26, 28 of joint body 22 is configured for coupling to a mounting post 36, 38 coupled to and extending from a medical light 12 or a support structure 14. The post-coupling terminal ends 26, 28 include the first and second openings 32, 34 of joint body 22 and extend into inner portion 40 of joint body 22. The post-coupling terminal ends 26, 28 each include at least one bearing 48, 50, 58, 60 and at least one brake 54, 56.

Bearings 48, 50, 58, 60 have openings 62 defining an inner surface 64 for receiving mounting posts. The bearings 48, 50, 58, 60 may optionally receive a bearing sleeve 52, 66, 67, 69 disposed between the mounting post 36, 38 and the inner surface 64 of the bearings 48, 50, 58, 60.

Bearings 48, 50, 58, 60 support the weight of the medical or dental light 12 and are either an extension of joint body 22 or are anchored to joint body 22 by any suitable method, such as, without limitation, bolts, clamps, locks, lugs, nuts, pins, rivets, screws, welds, or adhesive. Bearings 48, 50, 58, 60 may be constructed of the same or different material as joint body 22, such as, without limitation, steel, aluminum, titanium, metal alloys, hardened plastics, composite materials, and combinations thereof.

In the embodiment shown, first bearing 48 is located near the first terminal end 26 of joint body 22 and is coaxially aligned with first opening 32 of joint body 22 for receiving a first mounting post 36 therethrough. A second bearing 50 is located proximate the second terminal end 28 of joint body 22 and is coaxially aligned with second opening 34 of joint body 22 for receiving a second mounting post 38 therethrough. A third bearing 60 may be coaxially aligned with first bearing 48 to receive mounting post 36 therethrough. Likewise, a fourth bearing 60 may be coaxially aligned with second bearing 50 for receiving mounting post 38 therethrough.

Mounting posts 36, 38 are received in the aperture 68 of bearing sleeves 52, 66, 67, 69. Bearing sleeves 52, 66, 67, 69 may be disposed between with the outer surfaces 70 of mounting posts 36, 38 and inner surfaces 64 of openings 62 of bearings 48, 50, 58, 60. Bearing sleeves 52, 66, 67, 69 facilitate rotation of mounting posts 36, 38 about their respective longitudinal axes relative to joint body 22. Bearing sleeves 52, 66, 67, 69 may take any form that decreases resistance rotation, such as, without limitation, a bushing, pin bearings, roller bearings, or ball bearings. The bearing sleeves 52, 66, 67, 69 may be fabricated of any material suitable for reducing frictional resistance between posts 36, 38 and bearings 48, 50, 58, 60, such as plastics, composites, polymers, glass, and metals such as steel, aluminum, brass, and various alloys. In the embodiment depicted in FIGS. 2 and 3, bearing sleeves 52,66, 67, 69 are bushings 72 made of a material that is softer than mounting post 36 and inner surface 64 of bearings 48, 50, 58, 60, such as a brass or plastic.

At least a first brake 54 functions to hold medical light 12 in a desired position to illuminate a patient while at the same time allowing easy adjustment of the light's position. In the embodiment shown, first brake 54 is positioned proximate first bearing 48 of first terminal end 26 of joint body 22 and a second brake 56 is positioned proximate second bearing of second terminal end 28 of joint body 22.

Brakes 54, 56 have surfaces 74 for frictionally engaging mounting posts 36, 38 to resist rotation of the post 36, 38 relative to joint body 22. Brake 54, 56 may be semicircular or any other shape capable of frictionally engaging mounting post 36. Brakes 54, 56 may be coupled to articulating joint 10 by any suitable mechanism, such as with bolts, clamps, locks, lugs nut, pins, rivets, or screws. In one embodiment, brakes 54, 56 are coupled to joint body 22 with screws 76.

Brakes 54, 56 may be fabricated from any suitable braking material such as, without limitation, plastics, metals, composites, polymers, and alloys. It is contemplated that brakes 54, 56 may be made from a single material or from multiple materials. For example, brakes 54, 56 may include a post engaging portion 80 and an outer supporting portion 82. Post engaging portion 80 may be made from a braking material, such as, without limitation, a plastic, composite, soft metal, or cloth, and outer portion 82 may be made from a structural material, such as harder plastic, metal, or composite. Regardless of whether brakes 54, 56 are made from one or multiple materials, in one embodiment, the post engaging surfaces 74 of brakes 54, 56 are made from a material that is softer than posts 36, 38. Using a relatively soft material allows for easier maintenance of articulating joint 10 by simply changing brakes 54, 56 as it wears instead of having to change the entire posts 36, 38.

Brakes 54, 56 may be biased in directions to frictionally engage mounting posts 36, 38. As seen in FIGS. 2 and 3, in one embodiment, brakes 54, 56 are biased to uniformly to maintain frictional engagement with mounting posts 36, 38 by coupling brakes 54, 56 to joint body 22 with screws 76 and compressing springs 84 between screw head 86 and brakes 54, 56. Brakes 54, 56 may alternatively be biased with at least one spring, or with some other elastomeric material. The bias may be adjusted to increase or decrease the frictional engagement of brakes 54, 56 with mounting posts 36, 38. For example, screws 76 may be turned such that they further compress springs 84 thereby increasing the bias. This configuration allows for easy adjustment of the frictional engagement of brakes 54, 56 with mounting posts 36, 38 independently of cover 24, thereby avoiding problems associated with the prior art devices.

Mounting posts 36, 38 coupled to the medical light 12 or support structure 14 are generally cylindrical having first and second ends 90 and 92, respectively. First ends 90 of mounting posts 36, 38 are configured for coupling to medical light 12 or support structure 14, and second ends 92 of mounting posts 36, 38 are configured for engaging joint body 22 of articulating joint 10. Second ends 92 of mounting posts 36, 38 may also have grooves 100 around at least of a portion of their circumference to engage a retaining element to secure mounting posts 36, 38 to joint body 22. For example, as seen in FIGS. 2 and 3, mounting posts 36, 38 may have grooves 100 around the circumference near second ends 92. Posts 36, 38 may then be retained in joint body 22 with ring clamps 102. Other examples of retaining elements include, without limitation, screws, pins, nuts, and washers.

As illustrated in FIGS. 1-3, one exemplary embodiment of the present invention includes a double arcuate articulating joint 10, a medical light 12 coupled to a first post 36, and a support structure 14 coupled to second post 38.

Articulating joint 10 consists of a joint body 22 and a cover 24. Joint body 22 has first and second terminal ends 26, 28. At the first terminal end 26, first brake 54 is disposed between first bearing 48 and third bearing 58 proximate first terminal end 26. First post 36 is received in first and third bearing 48, 58. Bearing sleeves, 52, 66 are disposed between the outer surface of first post 70 and inner surface 64 of first and third bearings 48, 58. Washer 110 and ring clip 102 engage and retain the second end 92 of first post 36 in joint body 22. Bearing sleeves 52, 66 are bushing type bearings having a sleeve portion 112 and a cap portion 114. Sleeve portion 112 is disposed between the inner surface 64 of bearings 48, 58 and the outer surface 70 of first post 36. Cap portion 114 of bearing sleeve 52 is disposed between lower surface 104 of the first bearings and shoulder 116 at first end 90 of first post 36. Cap portion 114 of third bearing 58 is disposed between the upper surface 106 of third bearing 58 and washer 120. Ring clip 102 is adjacent to washer 120 and engages groove 100 located near the second end 92 of first post 36, thereby retaining first post 36 in joint body 22. First brake 54 is coupled to the joint body 22 by two screws 76. Each screw 76 is associated with a spring 84 located between the screw head 86 and the outer portion 82 of first brake 54. First brake 54 is semi-circular and is biased in the direction of first post 36 by springs 84. Increasing or decreasing the compression of springs 84 by either screwing or unscrewing the screws 76 easily adjusts the bias. In this embodiment, the bias may be easily adjusted independent of cover.

Similarly, proximate second terminal end 28 of joint body 22, second brake 56 is disposed between second bearing 50 and fourth bearing 60. Bearing sleeves 67, 69, are disposed between the outer surface of second post 38 and inner surface 64 of second and fourth bearings 50, 60. Bearing sleeves, 67, 69 are disposed between the outer surface of second post 38 and inner surface 64 of second and fourth bearings 50, 60. Washer 110 and ring clip 102 engage and retain the second end of second post 38 in joint body 22. Bearing sleeves 67, 69 are bushing 72 type bearings having a sleeve portion 112 and a cap portion 114. Sleeve portion 112 is disposed between the inner surface 64 of bearings 50, 60 and the outer surface 70 of second post 38. Cap portion 114 of bearing sleeve 67 is disposed between upper surface 122 of second bearing 50 and shoulder 116 at first end 90 of second post 38. Cap portion 114 of fourth bearing sleeve 69 is disposed between the lower surface 124 of fourth bearing 60 and washer 120. Ring clip 102 is adjacent to washer 120 and engages groove 100 located near the second end 92 of second post 38, thereby retaining second post 38 in joint body 22. Second brake 56 is coupled to the joint body 22 by two screws 76. Each screw 76 is associated with a spring 84 located between the screw head 86 and the outer portion 82 of second brake 56. Second brake 56 is semi-circular and is biased in the direction of the second post 38 by the two springs 84. Increasing or decreasing the compression of the springs 84 by either screwing or unscrewing the screws 76 easily adjusts the bias. Again, the bias may be easily adjusted independent of cover.

The first and second posts 36, 38 have first and second ends 90, 92. The first ends 90 are configured for coupling to the medical light 12 or support structure 14. The first ends 90 of the mounting posts 36, 38 have shoulder 116 adjacent to cap portion 114 of first and second bearing sleeves 52, 67 when mounting posts 36, 38 are placed in joint body 22. Second ends 92 of the posts 36, 38 are configured for engaging a retaining element. In this embodiment, the second end 92 of posts 36, 38 are retained in the post receiving structure by ring clip 102 that fits into groove 100. First and second posts 36, 38 are rotatably coupled to bearings 48, 50, 58, 60 through bearing sleeves 52, 66, 67, 69. First and second posts 36, 38 are frictionally engaged by first and second brakes 54, 56 to maintain the rotational position of the medical light 12.

Although only certain embodiments of this invention have been described in detail above, those skilled in the art will readily appreciate that many modifications are possible in the embodiments without materially departing from the novel teachings and advantages of this invention. The various features disclosed herein may be used alone or in any desired combination. Accordingly, all such modifications are intended to be included within the scope of this invention. For example, while this detailed description refers to dental or medical lights, it is understood that these two terms are interchangeable for the purposes of the present invention and are considered to cover lights for additional uses other than those specified herein. Further, it is contemplated that the presently claimed invention will encompass additional configurations of posts and post-receiving terminal ends having at least one bearing and at least one brake as described above. By way of example, the articulating joint could consist of first and second mounting posts extending from a central point having a first and second end, respectively. Correspondingly, both the medical light and the base could have a post receiving terminal ends having at least one bearing and at least one brake as described above extending therefrom to receive the first and second posts of the articulating joint.

What is claimed is:

1. An illumination apparatus, comprising:

a medical light having a first mounting post; and an articulating joint for coupling said medical light to a support structure having a second mounting post, said articulating joint comprising:

a joint body having first and second terminal ends;

a first bearing proximate said first terminal end, said first bearing having an inner surface, said first mounting post received in said first bearing along said inner surface;

a second bearing proximate said first terminal end and spaced apart from said first bearing, said second bearing coaxially aligned with said first bearing and having an inner surface adapted to receive said first mounting post therealong;

at least one first brake disposed between said first bearing and said second bearing and adjustably coupled to said joint body by at least one first fastener, said first brake having a first engagement surface for engaging said first mounting post;

at least one spring reacting against at least a portion of said first fastener and said first brake, said spring resiliently biasing said first brake in a direction such that said first engagement surface frictionally engages said first mounting post received in said first bearing and said second bearing, a third bearing proximate said second terminal end, said third bearing having an inner surface and being adapted to receive the second mounting post along said inner surface;

a fourth bearing proximate said second terminal end and spaced apart from said third bearing, said fourth bearing coaxially aligned with said third bearing and having an inner surface adapted to receive the second mounting post therealong; and at least one second brake disposed between said third bearing and said fourth bearing and adjustably coupled to said joint body by at least one second fastener, said second brake having a second engagement surface for engaging said second mounting post;

at least one spring reacting against at least a portion of said second fastener and said second brake, said spring resiliently biasing said second brake in a direction such that said second engagement surface frictionally engages the second mounting post received in said third bearing and said fourth bearing.

2. The illumination apparatus of claim 1, further comprising:

support structure for supporting said medical light, said support structure including a second mounting post.

3. The illumination apparatus of claim 1, further comprising:

at least one bearing sleeve disposed between said first mounting post and said inner surface of at least one of said first or second bearings.

4. The illumination apparatus of claim 1, further comprising:

at least one bearing sleeve disposed between said second mounting post and said inner surface of at least one of said third or fourth bearings.

5. The articulating joint of claim 1 further comprising a cover removably coupled to said joint body over at least one of said first bearing, said second bearing, said third bearing, said fourth bearing, said first brake, and said second brake.

6. An articulating joint for coupling a medical light having a first mounting post to a support structure having a second mounting post, said articulating joint comprising:

a joint body having first and second terminal ends;

a first bearing proximate said first terminal end, said first bearing having an inner surface and being adapted to receive a first mounting post along said inner surface;

a second bearing proximate said first terminal end of said joint body and spaced apart from said first bearing, said second bearing coaxially aligned with said first bearing and having an inner surface adapted to receive the first mounting post therealong;

at least one first brake disposed between said first bearing and said second bearing and adjustably coupled to said joint body by at least one first fastener, said first brake having a first engagement surface for engaging said first mounting post;

at least one spring reacting against at least a portion of said first fastener and said first brake, said spring resiliently biasing said first brake in a direction such that said first engagement surface frictionally engages the first mounting post received in said first bearing and said second bearing;

a third bearing proximate said second terminal end, said third bearing having an inner surface and being adapted to receive the second mounting post along said inner surface;

a fourth bearing proximate said second terminal end and spaced apart from said third bearing, said fourth bearing coaxially aligned with third bearing and having an inner surface adapted to receive the second mounting post therealong; and at least one second brake disposed between said third bearing and said fourth bearing and adjustably coupled to said joint body by at least one second fastener, said second brake having a second engagement surface for engaging said second mounting post;

at least one spring reacting against at least a portion of said second fastener and said second brake, said spring resiliently biasing said second brake in a direction such that said second engagement surface frictionally engages the second mounting post received in said third bearing and said fourth bearing.

7. The articulating joint of claim 6 wherein the first and second bearings are not coaxially aligned with the third and fourth bearings.

8. The articulating joint of claim 6 further comprising a cover removably coupled to said joint body over at least one of said first bearing, said second bearing, said third bearing, said fourth bearing, said first brake, and said second brake.

9. An articulating joint for coupling a medical light having a first mounting post to a support structure having a second mounting post, said articulating joint comprising:

a joint body having first and second terminal ends;

first and second coaxially aligned bearings proximate said first terminal end and adapted to receive the first mounting post along a common axis thereof;

a first brake disposed between said first and second bearings, said first brake movable in a radial direction with respect to said common axis of said first and second bearings, said first brake having a first engagement surface for engaging said first mounting post;

a first structure coupled to the joint body;

at least one spring reacting against said first structure and biasing said first brake for movement in said radial direction for frictional engagement with the first mounting post when the first mounting post is received in said first and second bearings;

third and fourth coaxially aligned bearings proximate said second terminal end and adapted to receive the second mounting post along a common axis thereof;

a second brake disposed between said third and fourth bearings, said second brake movable in a radial direction with respect to said common axis of said third and fourth bearings, said second brake having a second engagement surface for engaging said second mounting post;

a second structure coupled to the joint body;

at least one spring reacting against said second structure and biasing said second brake for movement in said radial direction for frictional engagement between the second engagement surface and the second mounting post when the second mounting post is received in said third and fourth bearings.

10. The articulating joint of claim 9 wherein the first and second coaxially aligned bearings are not coaxially aligned with the third and fourth coaxially aligned bearings.

11. The articulating joint of claim 9 further comprising a cover removably coupled to said joint body over at least one of said first bearing, said second bearing, said third bearing, said fourth bearing, said first brake, and said second brake.

* * * * *